United States Patent
Nabors

(10) Patent No.: US 8,556,310 B1
(45) Date of Patent: Oct. 15, 2013

(54) GRILL HOOK DEVICE

(76) Inventor: Ron Nabors, Casa Grande, AZ (US)

( * ) Notice: Subject to any disclaimer, the term of this patent is extended or adjusted under 35 U.S.C. 154(b) by 19 days.

(21) Appl. No.: 13/360,825

(22) Filed: Jan. 30, 2012

Related U.S. Application Data

(60) Provisional application No. 61/517,117, filed on Apr. 13, 2011.

(51) Int. Cl.
*F24B 15/00* (2006.01)

(52) U.S. Cl.
USPC .................................. 294/9; 294/26

(58) Field of Classification Search
USPC ........ 294/9, 10, 12, 17, 26, 175, 217; 254/21, 254/25, 121, 131
See application file for complete search history.

(56) References Cited

U.S. PATENT DOCUMENTS

| | | | | | |
|---|---|---|---|---|---|
| 358,803 | A | * | 3/1887 | Chestnut | 294/2 |
| 434,617 | A | * | 8/1890 | Wilhelm | 126/211 |
| 554,150 | A | * | 2/1896 | Smith | 294/2 |
| 1,334,510 | A | * | 3/1920 | Waterbury | 294/26 |
| 2,613,978 | A | * | 10/1952 | Marulli | 294/27.1 |
| 4,471,985 | A | | 9/1984 | Mahoney | |
| 5,137,314 | A | * | 8/1992 | Gunter | 294/15 |
| 5,183,304 | A | * | 2/1993 | Mair | 294/10 |
| D341,065 | S | * | 11/1993 | Martner | D7/690 |
| 5,729,854 | A | | 3/1998 | Powers | |
| 6,485,074 | B1 | | 11/2002 | Floyd | |
| 6,598,297 | B1 | * | 7/2003 | Matt | 30/142 |
| 6,752,441 | B1 | * | 6/2004 | Morris | 294/12 |
| 6,959,951 | B2 | * | 11/2005 | Amodeo | 294/10 |
| 7,108,304 | B2 | * | 9/2006 | White | 294/10 |
| D604,122 | S | | 11/2009 | Borovicka | |
| 2007/0210595 | A1 | * | 9/2007 | Quiles et al. | 294/17 |

* cited by examiner

*Primary Examiner* — Dean Kramer
(74) *Attorney, Agent, or Firm* — Emery L. Tracy

(57) ABSTRACT

A grill hook device for lifting a cooking surface grate from a charcoal grill or grill pit is provided. The cooking surface grate has a plurality of cross bars with the cross bars having a top surface and a bottom surface. The grill hook device comprises a center shaft having a first end and a second end. A handle is mounted to the first end of the center shaft. An anchor member extends from the center shaft between the first end and the second end of the center shaft. A hook mechanism is formed at the second end of the center shaft for receiving at least one of the cross bars for the cooking surface grate. Upon positioning at least one of the cross bars within the hook mechanism, the hook mechanism contacting the bottom surface of the at least one cross bar, and the anchor member against the top surface of the cross bars, the cooking surface grate is liftable from the grill.

18 Claims, 1 Drawing Sheet

GRILL HOOK DEVICE

The present application claims the benefit of priority of pending provisional patent application Ser. No. 61/517,117, filed on Apr. 13, 2011, entitled "Grill Hook".

BACKGROUND OF THE INVENTION

1. Field of the Invention

This invention relates generally to a grill hook device and, more particularly, the invention relates to a grill hook device providing an assistive hooking tool that is specially designed for use when lifting or removing a cooking surface grate from a charcoal grill or grill pit.

2. Description of the Prior Art

When cooking for a barbecue, many prefer to use convenient charcoal grills for their food preparation needs. Easy to operate, these handy devices can cook virtually any food item with the simple igniting of briquettes made of such materials as charcoal or mesquite. Another favored grilling method is the barbecue pit, which is essentially a hole in the ground loaded with wood and covered with a metal cooking surface. However, use of these practical grills is not without a drawback. Particularly, the more manual nature of these grilling devices requires that the grate, or metallic cooking surface, be lifted or removed several times during food preparation. This is mainly because it is often necessary to add more briquettes or wood as initial supplies burn out. Unfortunately, a grate that has been placed over a flame is, obviously, quite hot to the touch, so outdoor chefs have to employ makeshift methods such as cumbersome oven mitts, towels, tongs, or even pliers to in order to avoid burns. Then there is the need to remove the grate for cleaning after food preparation. Even if one smartly waits until the grate has cooled, the surface is coated with soot and food debris. As such, touching the dirty surface with the bare hands will lead to vigorous and time consuming hand washing, or indelible stains on gloves or towels employed for this purpose.

SUMMARY

The present invention is a grill hook device for lifting a cooking surface grate from a charcoal grill or grill pit. The cooking surface grate has a plurality of cross bars with the cross bars having a top surface and a bottom surface. The grill hook device comprises a center shaft having a first end and a second end. A handle is mounted to the first end of the center shaft. An anchor member extends from the center shaft between the first end and the second end of the center shaft. A hook mechanism is formed at the second end of the center shaft for receiving at least one of the cross bars for the cooking surface grate. Upon positioning at least one of the cross bars within the hook means, the hook means contacting the bottom surface of the at least one cross bar, and the anchor member against the top surface of the cross bars, the cooking surface grate is liftable from the grill.

In addition, the present invention is a grill hook device for lifting a cooking surface grate from a charcoal grill or grill pit. The cooking surface grate has a plurality of cross bars with the cross bars having a top surface and a bottom surface. The grill hook device comprises a center shaft having a first end and a second end. A handle is mounted to the first end of the center shaft. An anchor shaft having a first end and a second end is provided. The first end of the anchor shaft is attached to the center shaft between the first end and the second end of the center shaft. An anchor unit is mounted to the second end of the anchor shaft with the anchor unit having a substantially inverted "U" shape with a bent portion formed at each end of the anchor unit. A grill hook member curves outward from the second end of the center shaft with a portion of a distal end of the grill hook member bending around to a point substantially perpendicular to the remaining portion of the grill hook member. The grill hook member receives at least one of the cross bars for the cooking surface grate. Upon positioning at least one of the cross bars within the grill hook member, the grill hook member contacts the bottom surface of the at least one cross bar, and the anchor unit against the top surface of the cross bars, the cooking surface grate is liftable from the grill.

The present invention further includes a method for lifting a cooking surface grate from a charcoal grill or grill pit. The cooking surface grate has a plurality of cross bars with the cross bars having a top surface and a bottom surface. The method comprises providing a center shaft having a first end and a second end, mounting a handle to the first end of the center shaft, providing an anchor shaft having a first end and a second end, attaching the first end of the anchor shaft to the center shaft between the first end and the second end of the center shaft, mounting an anchor unit mounted to the second end of the anchor shaft, forming the anchor unit into a substantially inverted "U" shape, forming a bent portion at each end of the anchor unit, providing a grill hook member curving outward from the second end of the center shaft with a portion of a distal end of the grill hook member bending around to a point substantially perpendicular to the remaining portion of the grill hook member, positioning at least one of the cross bars within the grill hook member, contacting the bottom surface of the at least one cross bar with the grill hook member, positioning the anchor unit against the top surface of the cross bars, and lifting the cooking surface grate from the grill.

DETAILED DESCRIPTION OF THE PREFERRED EMBODIMENTS

Figure 2:
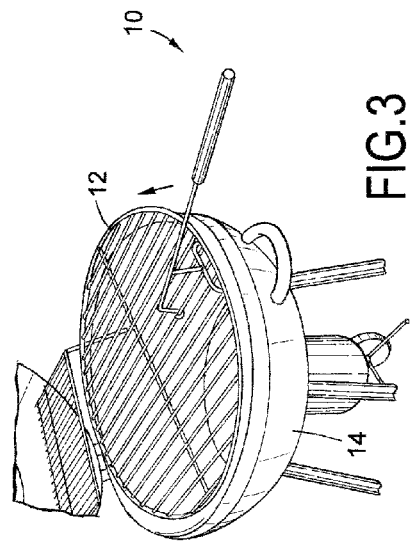
FIG. 2 is a perspective view illustrating the grill hook device, constructed in accordance with the present invention, prior to lifting the cooking surface grate from the grill.
Figure 3:
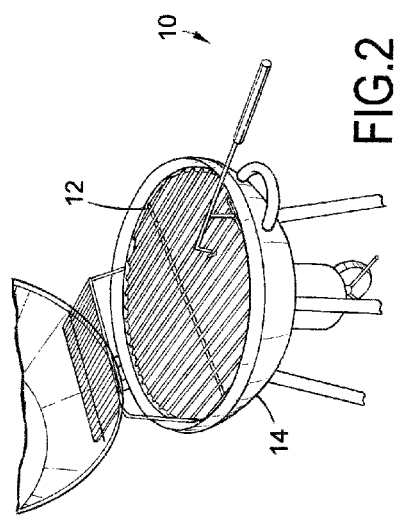
FIG. 3 is a perspective view illustrating the grill hook device, constructed in accordance with the present invention, subsequent to lifting the cooking surface grate from the grill.
Figure 1:
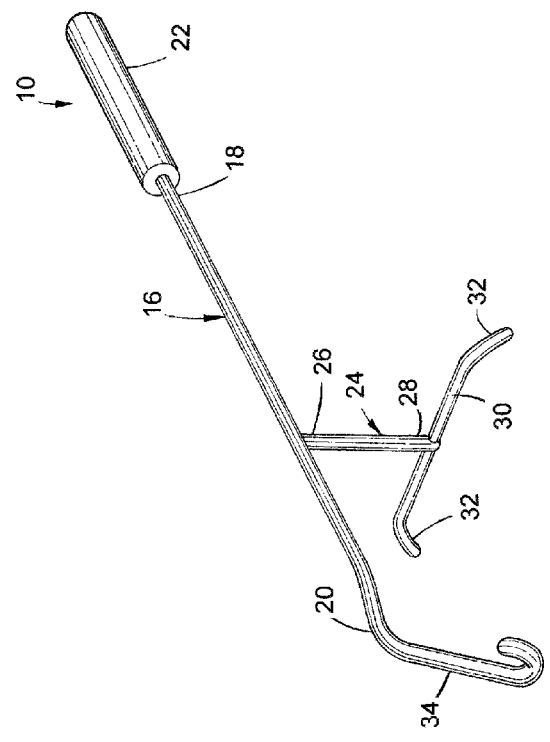
FIG. 1 is a perspective view illustrating a grill hook device, constructed in accordance with the present invention.

As illustrated in FIGS. 1-3, the present invention is a grill hook device, indicated generally at 10, providing an assistive hooking tool that is specially designed for use when lifting or removing a cooking surface grate 12 from a charcoal grill or grill pit 14. The grill hook device 10 of the present invention makes barbecuing an easier and more enjoyable experience and facilitates grilling that is safer and more convenient.

The grill hook device 10 of the present invention has a center shaft 16 having a first end 18 and a second end 20. Preferably, the center shaft 16 has a length of approximately ten (10") inches in length and a diameter of approximately one-quarter (¼") inch and constructed from a steel rod material. At the first end 18 of the center shaft 16 is a handle 22. Preferably, the handle 22 is approximately six (6") inches in length and approximately one (1") inch diameter and constructed from a wood material. It should be noted that constructing the center shaft 16 and the handle 22 with different dimensions and from different materials is within the scope of the present invention.

In addition, the grill hook device 10 of the present invention includes an anchor shaft 24 having a first end 26 and a second end 28. The first end 26 of the anchor shaft 24 is attached to the center shaft 16 at a position a little over half way past a center point of the center shaft 16 toward the second end 20 of the center shaft 16. The anchor shaft 24 has a length of approximately two and one-half (2½") inches and a diameter of approximately one-quarter (¼") inch and constructed from a steel rod material, similar to the center shaft 16.

The grill hook device 10 of the present invention further includes an anchor unit 30 mounted to the second end 28 of the anchor shaft 24 in the approximate center of the anchor unit 30 and substantially perpendicular to the anchor shaft 24. The anchor unit 30 is basically a horizontal, inverted "U" piece having a bent portion 32 formed at each end of the anchor unit 30. Each bent portion 32 is angled in a general downward direction at an angle of approximately thirty (30°) degrees. The anchor unit 30 preferably measures approximately four (4") inches in width and approximately one-quarter (¼") inch in diameter while each bent portion measures approximately three-eighths (⅜") inch in width and approximately one-quarter (¼") inch in diameter. The anchor unit 30 is preferably constructed from a steel rod material, similar to the center shaft 16 and the anchor shaft 24.

Furthermore, the grill hook device 10 of the present invention has a grill hook member 34 formed at the second end 20 of the center shaft 16. The grill hook member 34 curves outward from the second end 20 of the center shaft 16 for approximately two (2") inches with a portion of the distal end of the grill hook member 34 bending around to a point substantially perpendicular to the remaining portion of the grill hook member 34. Preferably, all or a portion of the grill hook member 34 is flattened for fitting between cross bars of the grate 12. In addition, the distal end portion is spaced approximately one-half (½") inch from the remaining portion of the grill hook member 34 allowing the grill hook member 34 to hook the grate 12 and lift the grate 12 from the grill 14, as will be described in further detail below.

The manner of use of the grill hook device 10 of the present invention will now be described. It will be understood by those skilled in the art that the manner of use of the grill hook device 10 described herein is merely one method of use and other methods of use of the grill hook device 10 are within the scope of the present invention.

Application and use of the grill hook device 10 of the present invention is very simple and straightforward. First, the user, grasping the grill hook device 10 by the handle 22, positions the anchor unit 30 and the grill hook member 34 over the grate 12 of the grill 14. The user then manipulates the bent portion of the grill hook member 34 between the cross bars of the grate 12. The fact that at least this portion of the grill hook member 34 is flattened further facilitates the insertion of the bent portion between the cross bars of the grate 12. Next, the user positions one of the cross bars within the bent portion of the grill hook member 34 thereby releasably grasping the cross bar. The grill hook device 10 is then manipulated such that the anchor unit 30 rests against the cross bars of the grate 12. Now, with a simple leverage motion, the user lifts the grill hook device 10 with the grate 12 securely grasped between the bent portion of the grill hook member 34 and the anchor unit 30 allowing the user to simply lift the grate 12 from the grill 14.

There are several significant benefits and advantages associated with the grill hook device 10 of the present invention. Foremost, the grill hook device 10 provides an efficient, easy to use method of managing a grill grate 12 in a hands-free manner. An assistive tool equipped with handy hook and anchor components, the grill hook device 10 eliminates the need to risk burns or employ gloves, towels, or whatever other tool may be handy when it is necessary to add more charcoal or wood to a grill 14 or pit. As such, the food cooked on these grills 14 can be prepared in an expedient, hassle-free way. In addition, the grill hook device 10 allows barbecuers to avoid touching greasy and sooty grill surfaces when they are removed for cleaning. Aspects of the grill hook device's 10 design offer additional advantages. The distal grill hook member 34 ensures a firm and secure hold while the grill hook device 10 is in use. Featuring an extended wooden handle 22, the grill hook device 10 effectively alleviates the risk of being burned while lifting a still-hot grill grate. In addition, the steel construction provides barbecue enthusiasts with a handy tool that will survive, many seasons of continued use. Not just for backyard barbecuers, restaurants that use grated devices will also appreciate the time and money saving benefits afforded by the grill hook device 10.

In sum, with the simplest of moves, a user need only grab the handle of the grill hook device 10 of the present invention, hook the grate 12, and lift and replace on the grill 14. The grill hook device 10 not only facilitates grate removal, but also can be employed to toss additional wood into a pit, without the user having to personally handle the wood.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A grill hook device for lifting a cooking surface grate from a charcoal grill or grill pit, the cooking surface grate having a plurality of cross bars, the cross bars having a top surface and a bottom surface, the grill hook device comprising:
   a center shaft having a first end and a second end;
   a handle mounted to the first end of the center shaft;
   an anchor member extending from the center shaft between the first end and the second end of the center shaft, the anchor member having an anchor shaft having a first end and a second end, the first end of the anchor shaft attached to the center shaft and an anchor unit mounted to the second end of the anchor shaft, the anchor unit having a substantially inverted "U" shape with a bent portion formed at each end of the anchor unit, each bent portion being angled in a general downward direction; and
   hook means formed at the second end of the center shaft for receiving at least one of the cross bars for the cooking surface grate;
   wherein upon positioning at least one of the cross bars within the hook means, the hook means contacting the bottom surface of the at least one cross bar, and the anchor member against the top surface of the cross bars, the cooking surface grate is liftable from the grill.

2. The grill hook device of claim 1 wherein the center shaft is constructed from a steel rod material.

3. The grill hook device of claim 1 wherein the handle is constructed from a wood material.

4. The grill hook device of claim 1 wherein the anchor member is attached to the center shaft at a position a between a center point of the center shaft and the second end.

5. The grill hook device of claim 4 wherein the anchor member is closer to the center point than the second end of the center shaft.

6. The grill hook device of claim 1 wherein the anchor unit is mounted to the anchor shaft in the approximate center of the anchor unit and substantially perpendicular to the anchor shaft.

7. The grill hook device of claim 1 wherein the anchor shaft is constructed from a steel rod material.

8. The grill hook device of claim 1 wherein the anchor unit is constructed from a steel rod material.

9. The grill hook device of claim 1 wherein the hook means comprises:
    a grill hook member curving outward from the second end of the center shaft with a portion of a distal end of the grill hook member bending around to a point substantially perpendicular to the remaining portion of the grill hook member.

10. The grill hook device of claim 9 wherein at least a portion of the grill hook member is flattened.

11. A grill hook device for lifting a cooking surface grate from a charcoal grill or grill pit, the cooking surface grate having a plurality of cross bars, the cross bars having a top surface and a bottom surface, the grill hook device comprising:
    a center shaft having a first end and a second end;
    a handle mounted to the first end of the center shaft;
    an anchor shaft having a first end and a second end, the first end of the anchor shaft attached to the center shaft between the first end and the second end of the center shaft;
    an anchor unit mounted to the second end of the anchor shaft, the anchor unit having a substantially inverted "U" shape with a bent portion formed at each end of the anchor unit, each bent portion being angled in a general downward direction; and
    a grill hook member curving outward from the second end of the center shaft with a portion of a distal end of the grill hook member bending around to a point substantially perpendicular to the remaining portion of the grill hook member, the grill hook member receiving at least one of the cross bars for the cooking surface grate;
    wherein upon positioning at least one of the cross bars within the grill hook member, the grill hook member contacts the bottom surface of the at least one cross bar, and the anchor unit against the top surface of the cross bars, the cooking surface grate is liftable from the grill.

12. The grill hook device of claim 11 wherein the anchor shaft is attached to the center shaft at a position a between center point of the center shaft and the second end.

13. The grill hook device of claim 12 wherein the anchor shaft is closer to the center point than the second end of the center shaft.

14. The grill hook device of claim 11 wherein the anchor unit is mounted to the anchor shaft in the approximate center of the anchor unit and substantially perpendicular to the anchor shaft.

15. The grill hook device of claim 11 wherein at least a portion of the grill hook member is flattened.

16. A method for lifting a cooking surface grate from a charcoal grill or grill pit, the cooking surface grate having a plurality of cross bars, the cross bars having, a top surface and a bottom surface, the method comprising:
    providing a center shaft having a first end and a second end;
    mounting a handle to the first end of the center shaft;
    providing an anchor shaft having a first end and a second end;
    attaching the first end of the anchor shaft to the center shaft between the first end and the second end of the center shaft;
    mounting an anchor unit mounted to the second end of the anchor shaft;
    forming the anchor unit into a substantially inverted "U" shape;
    forming a bent portion at each end of the anchor unit;
    providing a grill hook member curving outward from the second end of the center shaft with a portion of a distal end of the grill hook member bending around to a point substantially perpendicular to the remaining portion of the grill hook member;
    positioning at least one of the cross bars within the grill hook member;
    contacting the bottom surface of the at least one cross bar with the grill hook member;
    positioning the anchor unit against the top surface of the cross bars; and
    lifting the cooking surface grate from the grill.

17. The method of claim 16 and further comprising:
    flattening at least a portion of the grill hook member.

18. A grill hook device for lifting a cooking surface grate from a charcoal grill or grill pit, the cooking surface grate having a plurality of cross bars, the cross bars having a top surface and a bottom surface, the grill hook device comprising:
    a center shaft having a first end and a second end;
    a handle mounted to the first end of the center shaft;
    an anchor shaft having a first end and a second end, the first end of the anchor shaft attached to the center shaft between the first end and the second end of the center shaft, the anchor shaft attached to the center shaft at a position between a center point of the center shaft and the second end, the anchor shaft is closer to the center point than the second end of the center shaft;
    an anchor unit mounted to the second end of the anchor shaft, the anchor unit having a substantially inverted "U" shape with a bent portion formed at each end of the anchor unit; and
    a grill hook member curving outward from the second end of the center shaft with a portion of a distal end of the grill hook, member bending around to a point substantially perpendicular to the remaining portion of the grill hook member, the grill hook member receiving at least one of the cross bars for the cooking surface grate;
    wherein upon positioning at least one of the cross bars within the grill hook member, the grill hook member contacts the bottom surface of the at least one cross bar, and the anchor unit against the top surface of the cross bars, the cooking surface grate is liftable from the grill.

* * * * *